June 10, 1941.  H. M. JOHNSTON  2,245,344
ELEVATING DEVICE FOR BINDERS
Filed Dec. 18, 1939  2 Sheets-Sheet 1

INVENTOR
HOWARD M. JOHNSTON
BY
ATTORNEY

Patented June 10, 1941

2,245,344

UNITED STATES PATENT OFFICE 2,245,344

ELEVATING DEVICE FOR BINDERS

Howard M. Johnston, Toronto, Ontario, Canada, assignor to Massey - Harris Company Ltd., Toronto, Ontario, Canada, a corporation of Canada Application December 18, 1939, Serial No. 309,725

6 Claims. (Cl. 56—135)

The present invention relates to means for receiving the grain at the delivery end of the cutter bar conveyor of a binder and elevating and delivering it to the sheaf forming and binding device by novel elevating and grain directing devices.

The principal objects of my invention are to provide means for elevating and delivering the straw to a short horizontal binder deck after the straw has been moved parallel to the deck and knotter shaft.

I accomplish the foregoing objects by means of a cylinder having spaced transverse rows of arms which contact the straw as it leaves the cutter bar platform and convey it rearwardly and upwardly on a radius to the axis of the cylinder and having a stripper which causes the arms of individual rows to release the straw at a point about on a horizontal plane with the binder deck and at a time when the straw is moving vertically whereby the heads which are in advance of the butts, may discontinue their upward movement until the butts have been moved to the same height.

The head ends of the straw being heavy, will tend to discontinue their upward movement after being released by the arms at which time the other arms will continue to move the butts upward. Therefore when the straw finally is forced on the deck, it will be parallel to the deck and knotter shaft, then the straw will be forced toward and into the packers by the oncoming straw and will be packed and bound into perfectly formed bundles with the twine around the bundle at right angles thereto.

To these and other useful ends and for the purposes stated, my invention consists of parts, combinations of parts, or their equivalents, and mode of operation, as hereinafter described and claimed and shown in the accompanying drawings in which:

Figure 1:
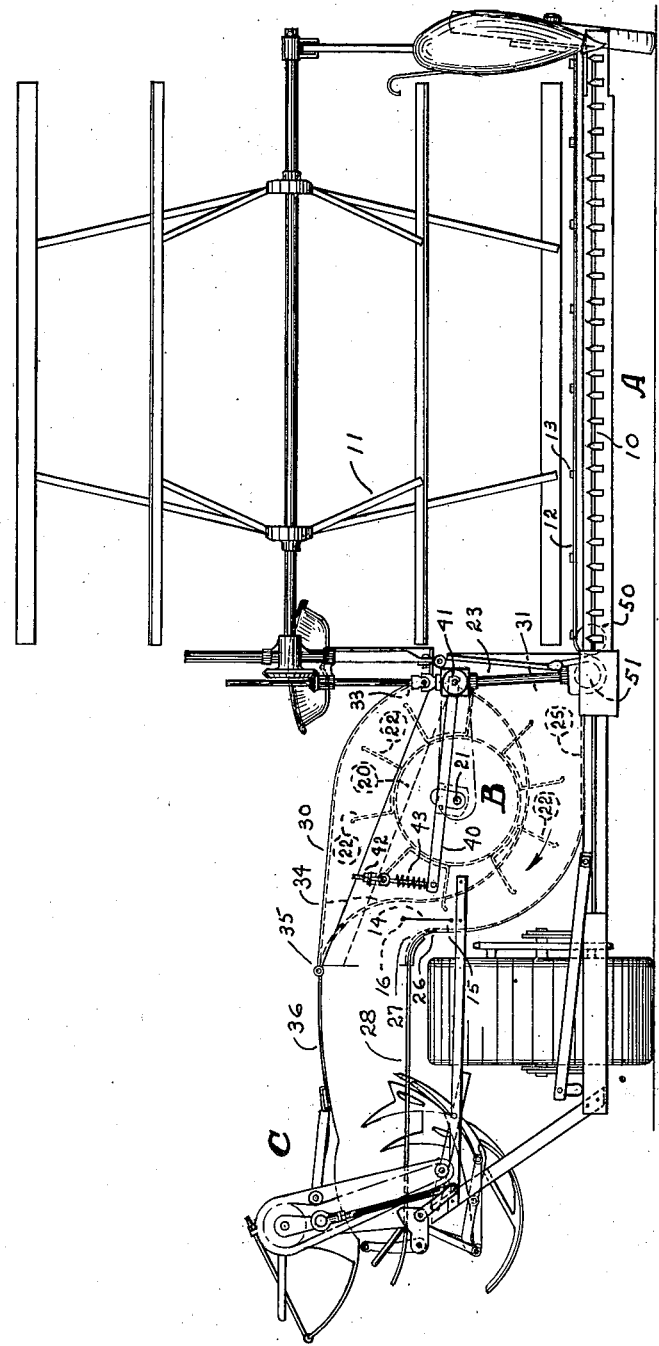
Fig. 1 is a front elevational view of a conventional binder equipped with my improved elevating device.

As thus illustrated, I designate the cutter bar, its conveyor and grain reel in their entirety by reference character A. My improved elevating device is designated in its entirety by reference character B. The bundle forming and binding device in its entirety is designated by reference character C.

Member A may obviously be conventional wherein numeral 10 designates the cutter bar. The grain gathering reel is designated by numeral 11 and the endless conveyor by numeral 12 having spaced slats 13.

Figure 2:
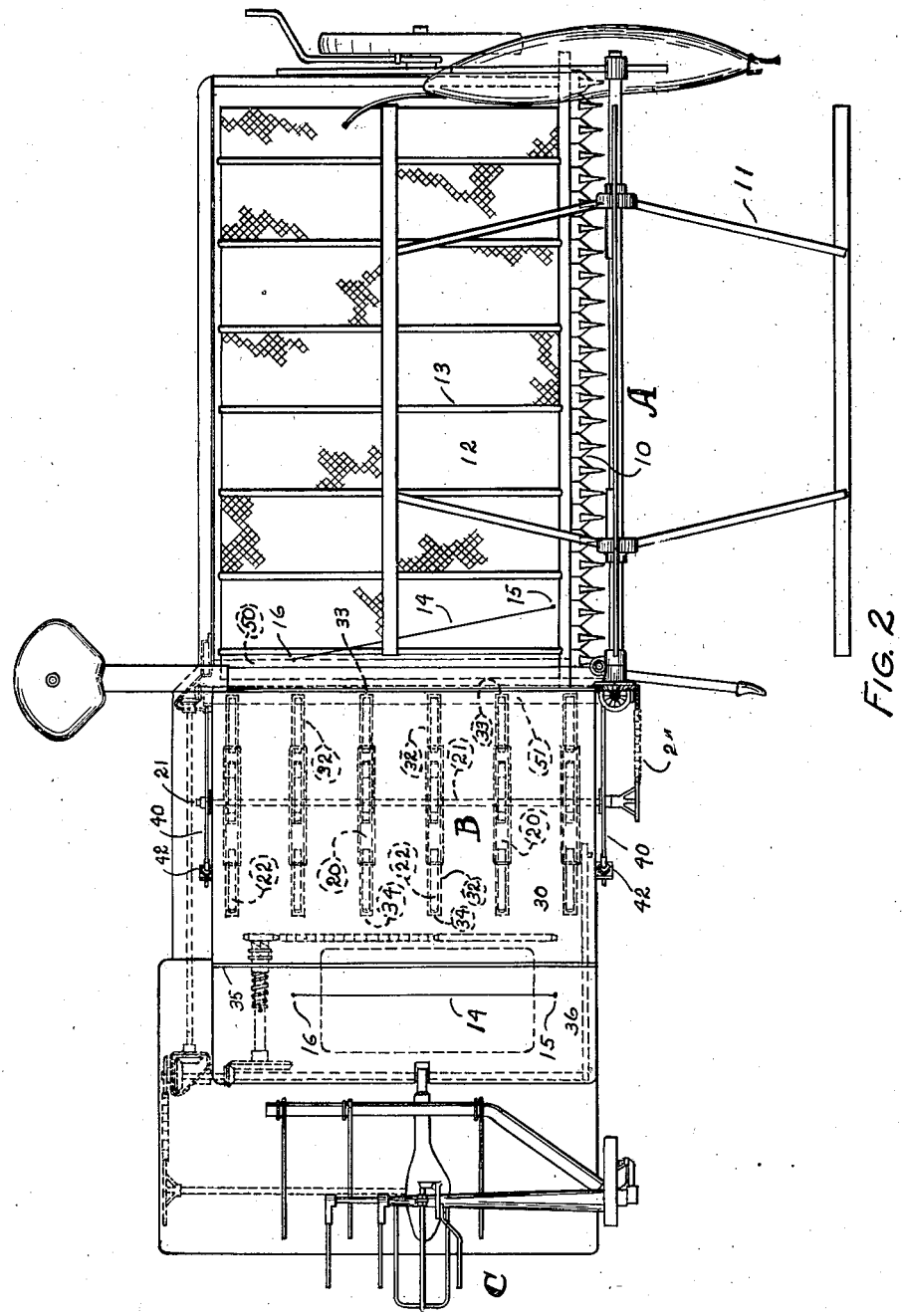
Fig. 2 is a top view of the binder as shown in Figure 1.

In all devices of the class and as designated by reference character A, the straw tends to assume an angle more or less as illustrated by line 14 (see Figure 2). The butts are designated by numeral 15 and the heads by numeral 16. Clearly the conventional double endless elevators will move the grain upwardly exactly as it is received. That is, the heads will be considerably ahead of the butts. Naturally the heads will leave the elevator first.

The deck upon which the grain is deposited extends downwardly at a considerable angle. Therefore the grain moves to the packer arms by gravity. Naturally the heads will tend to move still further ahead of the butts. Some binders are supplied with means adapted to urge the butts forward while on the deck. At best, this device only partially remedies the trouble because of the fixed speed of this device and the action of gravity and the packers.

Member B is adapted to remedy the next above described inherent defects in the conventional binder in the following manner:

I provide preferably a number of spaced discs or wheels 20 which are secured to shaft 21. Each of members 20 is provided with a number of peripherally spaced arms 22. Shaft 21 may be driven in any convenient manner. I have shown it as being operatively connected to shaft 23 by means of bevel gears and a chain 24 (see Figure 2). The discs or wheels turn in the direction indicated by curvilinear arrow in Figure 1 at a speed whereby arms 22 will travel at about the same speed of conveyor 12.

Conveyor 12 is adapted to deposit the grain on a primary deck 25 (see Figure 1). This deck is curved upwardly and rearwardly on a radius with shaft 21 until it reaches a vertical position as at 26. At this point, it curves rearwardly rapidly as at 27 intersecting the short horizontal binder deck 28.

I provide preferably a sheet metal housing 30 for discs 20 which is positioned eccentrically around the discs for the greater part of its diameter. Thus a deep inlet throat is provided for the grain as at 31 which is gradually reduced in depth until point 26 is reached from which point the housing curves upwardly and rearwardly terminating as at 35 thus to rapidly increase the depth of the rearwardly directed outlet passageway. The throat is first gradually decreased and then rapidly increased forming an inlet opening to the binder deck.

Slits 32 are cut into drum 30 beginning at 33 and terminating at 34 through which the individual rows of arms protrude as illustrated by dotted lines in Figure 1.

I provide a binder deck cover 36 which extends from 35 rearwardly for a short distance and then downwardly as illustrated.

Thus, by scrutinizing Figure 1, it will be seen that arms 22 gradually protrude through slits 32 until nearly their full lengths are exposed and then these arms gradually recede as indicated until they finally disappear at the outlet end of throat 31 within the housing at a point somewhere near the horizontal plane of deck 28.

Clearly the grain will be moved through throat 31 by arms 22 in exactly the longitudinal position it is in when it enters the throat. Clearly when the head ends of the straw are released by the receding rows of arms on a horizontal plane with deck 28, the butts will still be in contact with the arms.

In Figure 2 I illustrate the butts and heads being in the position illustrated by numerals 15 and 16. In Figure 1 I illustrate the position of the butts and heads by the same numerals directly after the head ends of the straw have been released from arms 22 by the action of the stripper. Clearly the heads will then discontinue to travel upward but the butts will continue to travel upward so that when the straw is ready to be moved on deck 28, it will be horizontal with this deck and parallel to the knotter shaft. It is then crowded forward on the deck by the incoming straw and will remain parallel to the knotter shaft until packed and bound into bundles.

It will be understood that member 36 and the upper portion of member 30 may be mounted on hinges as at 35 so these members may be lifted lid-like so as to expose to view the approach to the packers and knotters and the elevating device.

Obviously the shape of members 25 and 30 may be changed somewhat from that shown and these parts may be made to accommodate larger discs or longer or shorter arms.

The design shown has been most effective in tests that have been made. However, I do not wish to be limited to exact details as to relative size and shapes of the parts.

It will be noted by scrutinizing Figure 1 that shaft 21 is rotatably journaled in bearings which are secured to arms 40—40, the arms being pivotally mounted as at 41 and provided at their free ends with adjustable means 42 for fixing the position of arms 40. I provide springs 43 whereby the drums or discs will be yieldingly held in their adjusted position.

By referring to Figure 1 it will be seen that conveyor 12 is driven by a roller 50 and that a supplemental roller 51 is preferably positioned between conveyor 12 and deck 25. This supplemental roller serves to prevent the grain from being pulled under conveyor 12. For the purpose of simplicity in the specification and claims, it may be considered that the grain is deposited on deck 25 by conveyor 12.

Having thus shown and described my invention, I claim:

1. A binder of the class described, comprising a platform conveyor, an elevating device and a substantially horizontal binder deck, said elevating device positioned between said conveyor and binder deck and comprising a rotor having mounted thereon spaced rows of circumferentially positioned arms, an elevating deck adapted to receive the grain from said conveyor and extending horizontally for a short distance and then being curved upwardly on a radius with the axis of said rotor terminating at the receiving end of said binder deck, said binder deck being positioned somewhat above the horizontal plane of said axis, strippers positioned between said rows of arms and being eccentrically positioned relative to said rotor forming a deep inlet throat adjacent the delivery end of said platform conveyor and a gradually reduced throat to a point near the horizontal plane of said binder deck and then being extended upwardly and outwardly to thereby form an outlet for said throat to said binder deck, said arms adapted to contact the grain after it enters said throat and be disengaged therefrom near the horizontal plane of said deck.

2. A device as recited in claim 1 including; said rotor being carried on arms which are hingedly mounted at one end and having at their other ends a minimum height positioning device.

3. A binder elevating device of the class described, comprising a binder deck, a rotatably mounted shaft, arms arranged in longitudinal rows mounted on said shaft each row being in circumferential formation, a receiving deck extending horizontally for a short distance and then being curved rearwardly and upwardly on a radius with said shaft and then terminating by contact with said binder deck, stripping means extending from a point considerably above the inlet end of said receiving deck and being curved downwardly and rearwardly to a point past the vertical center of said shaft and then being curved rearwardly and upwardly to about the horizontal plane of said binder deck and then being curved upwardly and outwardly terminating a distance above said binder deck, said strippers being shaped to thereby form a gradually reduced in depth passageway for the grain to a point about horizontal with said binder deck, said arms adapted to contact the grain as it moves on said receiving deck and be released from the grain by said strippers at a point about horizontal with said binder deck.

4. A grain binder of the class described, comprising a platform conveyor, a bundle forming and binding device and an elevating rotor and a relatively short horizontal binder deck between said binding device and rotor, said rotor having a number of longitudinally circumferentially positioned spaced rows of arms, a platform deck adapted to receive the grain from said platform conveyor and being horizontal for a distance and then being curved on a radius with the axis of said rotor and terminating in a sharp outward curve which intersects said binder deck, said binder deck being a distance above the horizontal axis of said rotor, an eccentrically positioned stripper housing around said rotor forming a deep inlet throat for the reception of the grain, the lowest part being adjacent the rotor and then being curved outwardly and upwardly to a point about on the horizontal plane of said binder deck and then being formed in an outward curve intersecting the upper part of said housing and contacting a rearwardly extending cover for said binder deck, slits cut in the lower portion of said housing through which said rows of arms may extend whereby they contact the grain as it enters said throat and whereby the contact is released when each arm of the rows of arms reaches about the same horizontal plane as said binder deck.

5. A binder elevator of the class described, comprising a binder deck, a platform conveyor, and an elevating rotor therebetween, the axis of which is a distance below the horizontal plane of the receiving end of said binder deck and having spaced rows of peripherally spaced arms, a grain guideway forming an operating connection between said conveyor and binder deck, the entrance end being substantially horizontal for a distance and terminating near the vertical plane of said axis and a short distance from the path of the ends of said arms, the remainder being on substantially a radius with said axis and being connected to the entrance end of said binder deck, strippers positioned eccentrically below said rotor, the nearest part being near the vertical plane of said axis and a distance above the path of the ends of said arms and extending therefrom to gradually approach the inlet end of said binder deck and then being extended upwardly and curved outwardly terminating a considerable distance above the inlet end of said binder deck, forming an enlarged horizontal outlet.

6. A binder elevator of the class described, comprising a rotatably mounted cylinder having spaced rows of peripherally spaced arms, a horizontal grain receiving deck terminating near the vertical plane of the axis of said rotor and a short distance below the path of the ends of said arms and having an intermediate deck curved rearwardly and upwardly on substantially a radius with said axis terminating at a point somewhat above said axis and then being turned outwardly forming a binder deck, stripping means positioned eccentrically below said cylinder forming a deep inlet throat above the receiving end of said receiving deck and gradually approaching each said decks to a point adjacent said binder deck and then being extended upwardly and curved outwardly to thereby form a deep horizontal outlet for said throat, said strippers adapted to permit said arms to engage the grain as it enters said throat and to be disengaged therefrom near the horizontal plane of the entrance end of said binder deck.

HOWARD M. JOHNSTON.